United States Patent
Shin et al.

(10) Patent No.: US 9,330,325 B2
(45) Date of Patent: May 3, 2016

(54) APPARATUS AND METHOD FOR REDUCING NOISE IN FINGERPRINT IMAGES

(71) Applicant: SUPREMA INC., Gyeonggi-do (KR)

(72) Inventors: Hochul Shin, Gyeonggi-do (KR); BoGun Park, Gyeonggi-do (KR); Kideok Lee, Gyeonggi-do (KR); Jinwook Yi, Gyeonggi-do (KR); Bong Seop Song, Gyeonggi-do (KR); Jae Won Lee, Gyeonggi-do (KR)

(73) Assignee: SUPREMA INC., Gyeonggi-Do (KR)

( * ) Notice: Subject to any disclaimer, the term of this patent is extended or adjusted under 35 U.S.C. 154(b) by 240 days.

(21) Appl. No.: 13/932,168

(22) Filed: Jul. 1, 2013

(65) Prior Publication Data

US 2014/0286546 A1 Sep. 25, 2014

(30) Foreign Application Priority Data

Mar. 22, 2013 (KR) ........................ 10-2013-0031035

(51) Int. Cl.
*G06K 9/00* (2006.01)
*G06K 9/40* (2006.01)

(52) U.S. Cl.
CPC .............. *G06K 9/40* (2013.01); *G06K 9/00067* (2013.01)

(58) Field of Classification Search
USPC .......................................... 382/115, 124, 125
See application file for complete search history.

(56) References Cited

U.S. PATENT DOCUMENTS

| 4,811,414 | A  | * | 3/1989  | Fishbine et al. ............... 382/272 |
| 6,002,815 | A  | * | 12/1999 | Immega et al. ................ 382/312 |
| 6,125,192 | A  |   | 9/2000  | Bjorn et al. |
| 6,330,345 | B1 | * | 12/2001 | Russo et al. ................... 382/115 |
| 6,400,836 | B2 | * | 6/2002  | Senior ................... G06F 1/1616 382/115 |
| 6,535,622 | B1 | * | 3/2003  | Russo et al. ................... 382/124 |
| 7,356,168 | B2 | * | 4/2008  | Tavares ......................... 382/115 |
| 7,454,624 | B2 | * | 11/2008 | LaCous ......................... 713/186 |
| 2004/0133582 | A1 | * | 7/2004 | Howard et al. ................ 707/100 |
| 2009/0232397 | A1 | * | 9/2009 | Hara .................. G06K 9/00067 382/169 |
| 2015/0071502 | A1 | * | 3/2015 | Breznicky .......... G06K 9/00067 382/115 |

FOREIGN PATENT DOCUMENTS

JP        11-134498 A    5/1999
KR   10-2004-0090548   10/2004

* cited by examiner

*Primary Examiner* — Ishrat I Sherali
(74) *Attorney, Agent, or Firm* — Bacon & Thomas, PLLC (57) ABSTRACT

An apparatus for processing a fingerprint image, the apparatus includes a noise information estimation unit configured to estimate information for a noise removal from at least two or more images recognized for a first section before a point of time when a fingerprint contact is initiated. The apparatus includes a fingerprint image acquiring unit configured to correct at least one image recognized for a predetermined time period after the completion of the fingerprint contact using the estimated information to acquire the fingerprint image.

15 Claims, 5 Drawing Sheets

APPARATUS AND METHOD FOR REDUCING NOISE IN FINGERPRINT IMAGES

RELATED APPLICATIONS

This application claims the benefit of Korean Patent Application No. 10-2013-0031035, filed on Mar. 22, 2013, which is hereby incorporated by reference as if fully set forth herein.

FIELD OF THE INVENTION

The present invention relates to a fingerprint image processing, and more particularly, to an apparatus and method for processing a fingerprint image, which estimates noise information on a basis of a plurality of images and acquires the fingerprint image on a basis of the plurality of images and the noise information.

BACKGROUND OF THE INVENTION

In general, a method to get fingerprint information among biometric information about the human includes an indirect method using a picture input device such as a scanner or a camera to capture a part of the fingerprint of a finger which is imprinted on a paper and an optical method and a non-optical method using an electric field.

Among others, the optical method is the most efficient and universal method. A device to get the fingerprint with an optical method is typically called an optical fingerprint input device.

Such an optical fingerprint input device diffuses light emitted from a light source, allows a fingerprint picked by a prism to be imaged through a lens, and converts a shape of the fingerprint into electrical signals using a sensor. The converted electrical signal is subjected to an image processing to acquire a fingerprint image.

In the optical fingerprint input device, a residual fingerprint is generated by sebum and dirt in accordance with the contact of the fingerprint and a variety of background noises is induced in the course of acquiring the fingerprint image. The residual fingerprint and the background noise have a close relationship with respect to a recognition rate of the fingerprint and security in a fingerprint recognition technology, and thus various researches are in progress in order to remove them.

SUMMARY OF THE INVENTION

In view of the above, the present invention provides an apparatus and method for processing a fingerprint image, which estimates noise information on a basis of at least two or more images before the point of time when a fingerprint contact is initiated and corrects the images that are input for a predetermined time period after the completion of the fingerprint contact using the estimated noise information to acquire the fingerprint image.

In accordance with an exemplary embodiment of the present invention, there is provided an apparatus for processing a fingerprint image, which includes: a noise information estimation unit configured to estimate information for a noise removal from at least two or more images recognized for a first section before a point of time when a fingerprint contact is initiated; and a fingerprint image acquiring unit configured to correct at least one image recognized for a predetermined time period after the completion of the fingerprint contact using the estimated information to acquire the fingerprint image.

In the exemplary embodiment, the point of time when the fingerprint contact is initiated is a point of time when a feature value indicative of whether there exists a fingerprint is subjected to a change in the fingerprint image processing apparatus.

In the exemplary embodiment, the feature value is a value output from a proximity sensor installed in the fingerprint image processing apparatus, a value output from a transparent electrode sensor to which the fingerprint is contacted, or a changed value in a pixel in the image recognized in the fingerprint image processing apparatus.

In the exemplary embodiment, the noise information estimation unit is configured to estimate the information by calculating a mean value and a variance by pixel or by block having a given size or by image in the respective image within the first section.

In the exemplary embodiment, the fingerprint image acquiring unit is configured to: calculate a noise tolerance range based on the variance, calculate pixel values by pixel or by block, or by image in the respective images from after the completion of the fingerprint contact to a predetermined time period, offset the calculated pixel values using a mean value calculated by the noise information estimation unit, and determine a background region and a fingerprint region through the comparison between a resultant value caused by the offset and the noise tolerance range; and set the background region to a predetermined fixed value to acquire the fingerprint image.

In the exemplary embodiment, the fingerprint image acquiring unit is configured to give a weight to portions which has been set as the fingerprint region for the predetermined time period after the completion of the fingerprint contact and add the weighted values to acquire the fingerprint image.

In the exemplary embodiment, the noise tolerance range is calculated using the variance and a noise tolerance standard that is set by pixel, by block or by image.

In the exemplary embodiment, the apparatus further includes a buffer configured to buffer the images that are input to the fingerprint image processing apparatus from before a point of time when the fingerprint contact is recognized to the predetermined time period.

In accordance with another exemplary embodiment of the present invention, there is provided an method for processing a fingerprint image, which includes: buffering images for the storage thereof; storing a point of time when a fingerprint contact is initiated in the course of buffering the images; drawing out images within a first section among the buffered images, wherein the first section is a section before a point of time when the fingerprint contact is initiated; estimating information for a noise removal when a predetermined time period lapse after the fingerprint contact has been completed; drawing out images within a third section among the buffered images, wherein the third section is a section from after the completion of the fingerprint contact to the predetermined time period; and correcting the images within the third section using the estimated information to acquire the fingerprint image.

In the exemplary embodiment, said storing a point of time when a fingerprint contact is initiated: storing a point of time when a feature value indicative of whether there exists a fingerprint is subjected to a change in the fingerprint image processing apparatus.

In the exemplary embodiment, the feature value is a value output from a proximity sensor installed in the fingerprint image processing apparatus, a value output from a transparent electrode sensor to which the fingerprint is contacted, or a changed value in a pixel in the image recognized in the fingerprint image processing apparatus.

In the exemplary embodiment, said estimating information for a noise removal includes: estimating the information by calculating a mean value and a variance by pixel or by block having a given size, or by image using the at least two images within the first section.

In the exemplary embodiment, said correcting the images includes: calculating a noise tolerance range based on the variance, calculating pixel values by pixel, or by block or by image of the respective images within the third section; offsetting the calculated pixel values using a mean value calculated by the noise information estimation unit and determining a background region and a fingerprint region through the comparison between a resultant value caused by the offset and the noise tolerance range; and setting the background region to a predetermined fixed value to acquire the fingerprint image.

In the exemplary embodiment, said correcting the images includes: giving a weight to portions which has been set as the fingerprint region the images within the third section; and adding the weighted values to acquire the fingerprint image.

In the exemplary embodiment, said calculating a noise tolerance range includes: calculating the noise tolerance range using the variance and a noise tolerance standard that is set by pixel, by block or by image.

As described above, the embodiments of the present invention use the images of multiple points of time including the points of time before and after the fingerprint contact, thereby raising the accuracy of the statistical noise information.

Further, the embodiments of the present invention selectively corrects the images after a point of time when the fingerprint contact has been completed and stabilized using the estimated background noise information, thereby raising the quality of the fingerprint image.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Hereinafter, embodiments of the present invention will be described in detail with reference to the accompanying drawings which form a part hereof.

Figure 1:
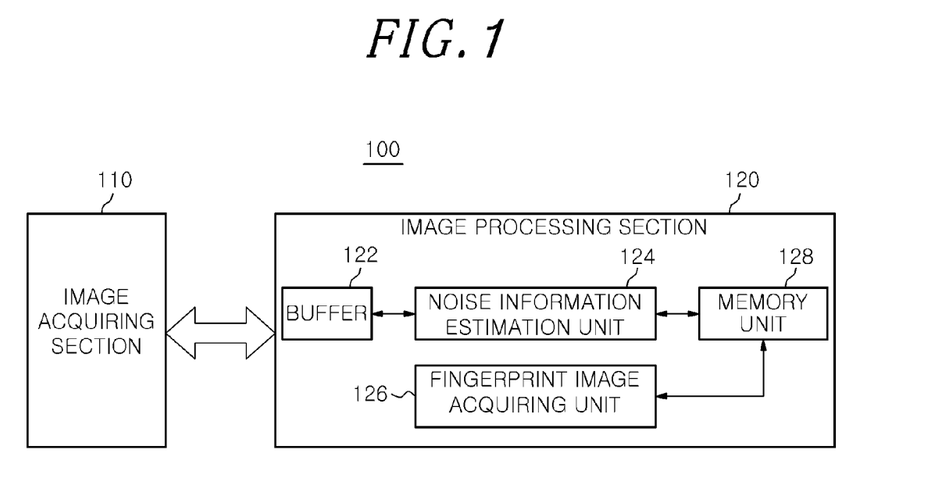
FIG. 1 is a block diagram of an apparatus for processing a fingerprint image on a multi-frame basis in accordance with an exemplary embodiment of the present invention.

FIG. 1 is a block diagram of an apparatus for processing a fingerprint image on a multi-frame basis in accordance with an exemplary embodiment of the present invention.

An apparatus for processing a fingerprint image 100 includes an image acquiring section 110 and an image processing section 120.

The image acquiring section 110 acquires fingerprint images acquired after a fingerprint of a finger is contacted, or images acquired before a fingerprint of a finger is contacted. The images acquired by the image acquiring section 110 are provided to the image processing section 120.

The image acquiring section 110 may be provided with a fingerprint contact surface, optical source, prism, and sensor such as a proximity sensor or a transparent electrode sensor. The procedure of acquiring the images by the image acquiring section 110 will be described as follows.

Light from the optical source is provided through the fingerprint contact surface at a point of time when a fingerprint contact is initiated. Some of the light is reflected from or absorbed in the valleys and ridges of the fingerprint, and the reflected light is incident on the prism to image on the lens. The light imaged on the lens is sensed by the sensor, so that a fingerprint image can be provided to the image processing section 120.

On the other hand, before a point of time when the fingerprint contact is initiated, when light from an external optical source other than the intrinsic optical source of the fingerprint image processing apparatus 100 is incident at an angle of a particular range, an image of the fingerprint contact surface is sensed by the sensor. The image of the fingerprint contact surface is provided to the image processing section 120 where the image may be used to remove noise at the time of the detection of the fingerprint image. In accordance with the embodiment, it is preferred that the image used for the noise removal may be at least two or more images which has been acquired before the initiation of the fingerprint contact for a predetermined time period. In accordance with the embodiment of the present invention, the point of time when the fingerprint contact is initiated may be recognized through the change in an arbitrary feature value used to determine whether the fingerprint exists. The feature value may include a brightness value of pixels in the images that are input to the image processing section 120, a value output from proximity sensors (not shown) installed in or around the image acquiring section 110, or a value output from a transparent electrode sensor (not shown) installed on the fingerprint contact surface of the image acquiring section 110, but is not limited thereto.

The image processing section 120 buffers to store the images provided continuously from before the point of time when the fingerprint contact is initiated through the use of the image acquiring section 110. The buffered images may be eliminated after the acquisition of the fingerprint image.

When a predetermined time period elapses after the fingerprint contact has been completed, the image processing section 120 performs an image processing for a fingerprint recognition.

Figure 2:
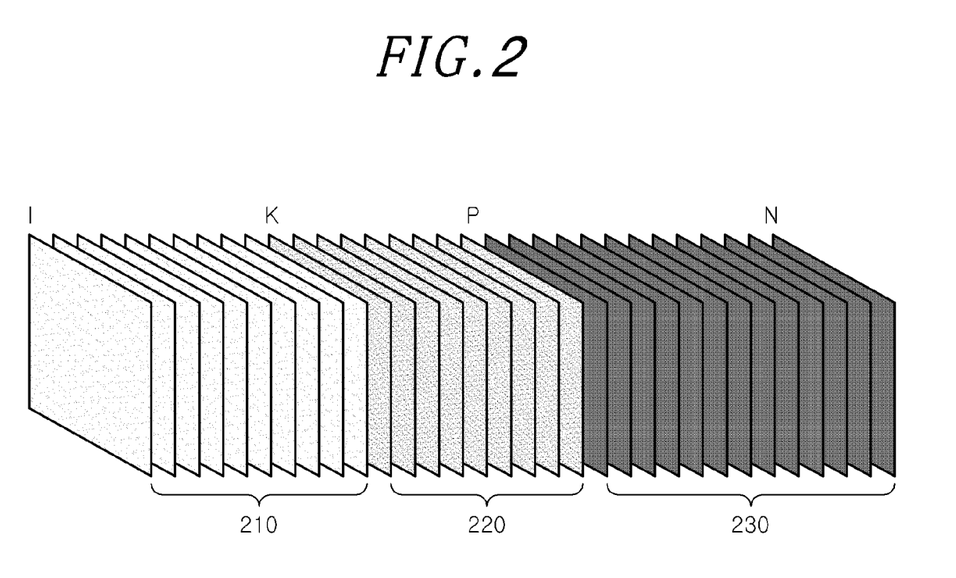
FIG. 2 shows the images buffered in a buffer in the fingerprint image processing apparatus in accordance with an exemplary embodiment of the present invention.

More specifically, as illustrated in FIG. 2, the image processing section 120 performs the image processing by spatially dividing the buffered images into three sections, that is, a section before a point of time when the fingerprint contact is initiated (hereinafter referred to as a first section 210), a section from a point of time when the fingerprint contact is initiated to a point of time when the fingerprint contact is completed (hereinafter referred to as a second section 220), and a section from a point of time when the fingerprint contact is completed to a point of time when a predetermined time period lapses (hereinafter referred to as a third section 230). Through the image processing, the image processing section 120 estimates a noise and acquires the fingerprint image.

In accordance with the embodiment of the present invention, the first section 210 may include at least two or more images; the second section 220 may include one or more images or may not include any image; and the third section 230 may include at least one or more image. For example, assuming that N number of images is used for the image processing, as illustrated in FIG. 2, the first section 210 is composed of K−1 number of images, the second section 220 is composed of K-(P−1) number of images, and the third section 230 is composed of N-(P+1) number of images.

For the purpose of the image processing in accordance with the embodiment of the present invention, the image processing section 120 includes a buffer 122, a noise information estimation unit 124, and a fingerprint image acquiring unit 126, and a memory unit 128.

The buffer 122 buffers to store images corresponding to the first section 210, the second section 220 and the third section 230. In other words, the buffer 122 buffers to store images from the point of time when the fingerprint contact is initiated to the point of time when a predetermined time period lapses after the point of time when the fingerprint contact has been completed. The image buffered in the buffer 122 may be eliminated after the completion of the acquisition of the fingerprint image.

The noise information estimation unit 124 draws out the images included in the first section 210 to estimate information for a noise removal. Herein, the information for the noise removal may be information for removing a background noise including a residual fingerprint.

Such a noise information estimation unit 124 draws out the images corresponding to the first section 210 from among the images stored in the buffer 122 and calculates a mean value corresponding to an offset and a variance, e.g., a deviation value over the several images within the first section 210 by pixel, by block having a given size, or by image, using the images in the first section 210. The calculated mean value and the calculated variance are then stored in the memory unit 128.

The fingerprint image acquiring unit 126 eliminates a noise component in the images corresponding to the third section 230 using the variance and mean value stored in the memory unit 128 to obtain fingerprint images having an improved quality. Further, the fingerprint image acquiring unit 126 ultimately acquires a final fingerprint image by blending the fingerprint images having the improved quality within the third section 230 at an arbitrary ratio. More specifically, the fingerprint image acquiring unit 126 offsets a pixel, a block or an image in the respective images within the third section 230 using the mean value by pixel by block or by image, respectively, which is stored in the memory unit 128, and defines a fingerprint region and a background region through the comparison between a resultant value caused by the offset and a noise tolerance range created on a basis of the variance. For example, the fingerprint image acquiring unit 126 may set a predetermined fixed value which corresponds to the brightness of a background to the background region.

Meanwhile, the memory unit 128 stores the point of time when the fingerprint contact is initiated and the point of time when the fingerprint contact is completed. The noise information estimation unit 124 divides the images buffered in the buffer 122 into the sections using the point of time of the initiation of the fingerprint contact and the point of time of the completion of the fingerprint contact.

As described above, the background region other than the fingerprint region is set to the predetermined fixed value, thereby obtaining the fingerprint image with the background noise being removed.

A procedure in which the fingerprint image processing apparatus 100 removes the noise component, and the fingerprint image acquiring unit 126 acquires a final fingerprint image will be described with reference to FIG. 3, FIG. 4A and FIG. 4B.

Figure 3:
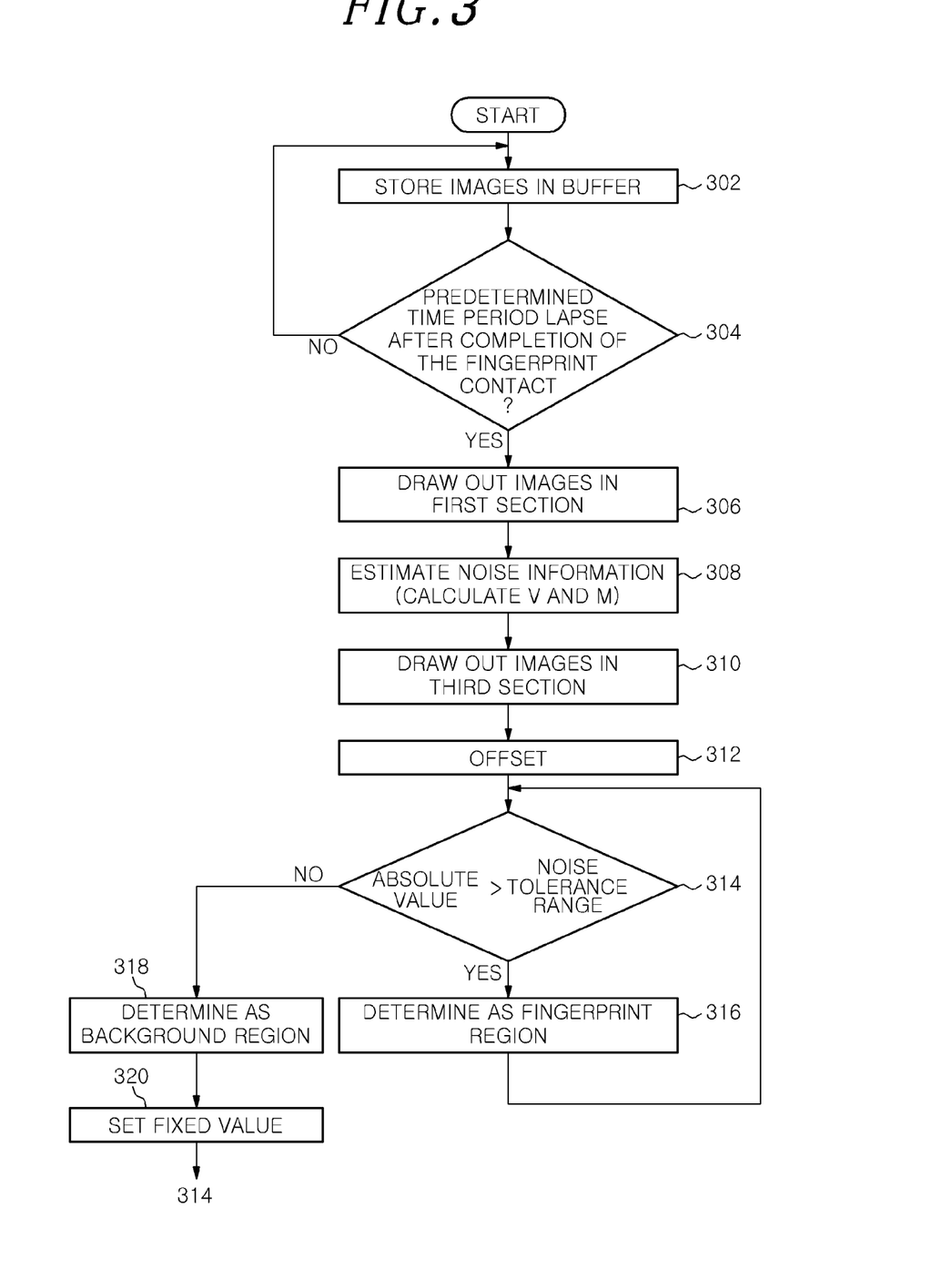
FIG. 3 is a flowchart illustrating a process of acquiring a fingerprint image on a multi-frame basis in accordance with an exemplary embodiment of the present invention.

FIG. 3 is a flowchart illustrating a process of acquiring a fingerprint image in accordance with an embodiment of the present invention; FIG. 4A depicts a diagram illustrating a procedure of estimating information for a noise removal using images corresponding to the first section 210 from among the images buffered in the fingerprint image processing apparatus; and FIG. 4B depicts a diagram illustrating a procedure of correcting the images corresponding to the third section 230 from among the images buffered in the fingerprint image processing apparatus.

As illustrated in FIG. 3, in operation 302, the fingerprint image processing apparatus 100 sequentially stores the images acquired from the image acquiring section 110 in the buffer 122 of the image processing section 120.

During the storage of the images, when it is determined that a predetermined time period lapses after the fingerprint contact is initiated and completed, in operation 304, the image processing section 120 performs an image processing using the images stored in the buffer 122. Although there is not illustrated in the drawing, when the image processing section 120 recognizes the point of time when the fingerprint contact is initiated, the image processing section 120 stores in the memory unit 128 the point of time when the fingerprint contact is initiated and the point of time when the fingerprint contact is completed.

In other words, the noise information estimation unit 124 of the image processing section 120 draws out the images corresponding to a section before the point of time when the fingerprint contact is initiated, i.e., at least two images within the first section 210, from the buffer 122, in operation 306, and estimates information on a background noise from the at least two images corresponding to the first section 210, in operation 308. That is, the noise information estimation unit 124 calculates a mean value M and a variance V by pixel, by block or by image with respect to the several images within the first section 210 and stores the calculated mean value M and the variance V in the memory unit 128.

Figure 4A:
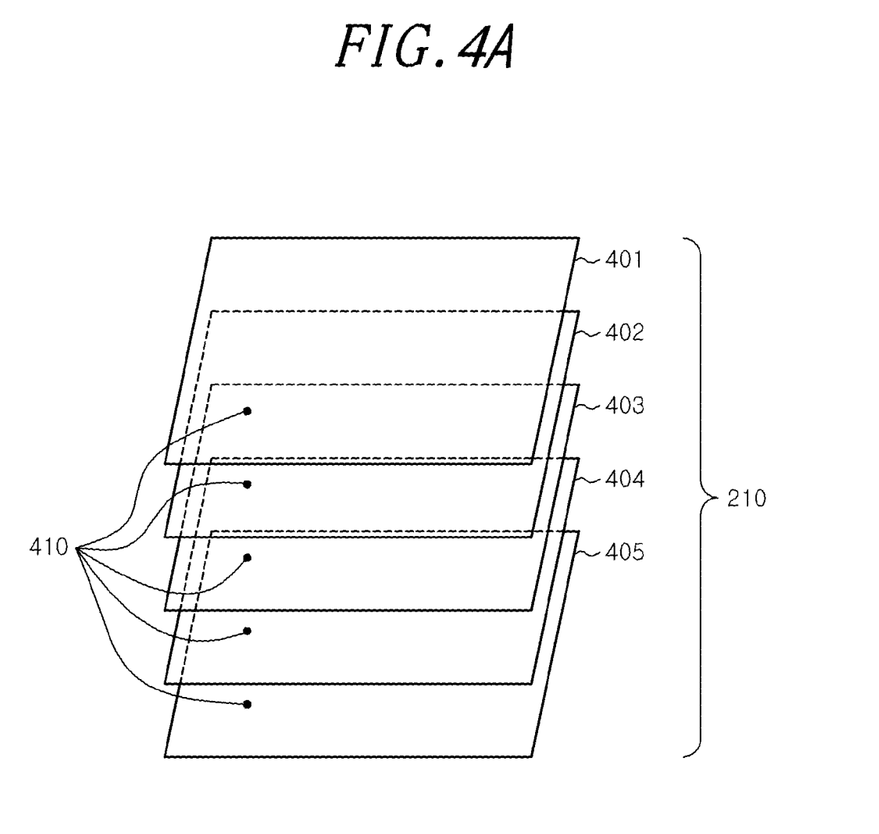
FIG. 4A depicts a diagram illustrating a procedure of estimating information for a noise removal using the image included in a first section among the images buffered in the fingerprint image processing apparatus.
Figure 4B:
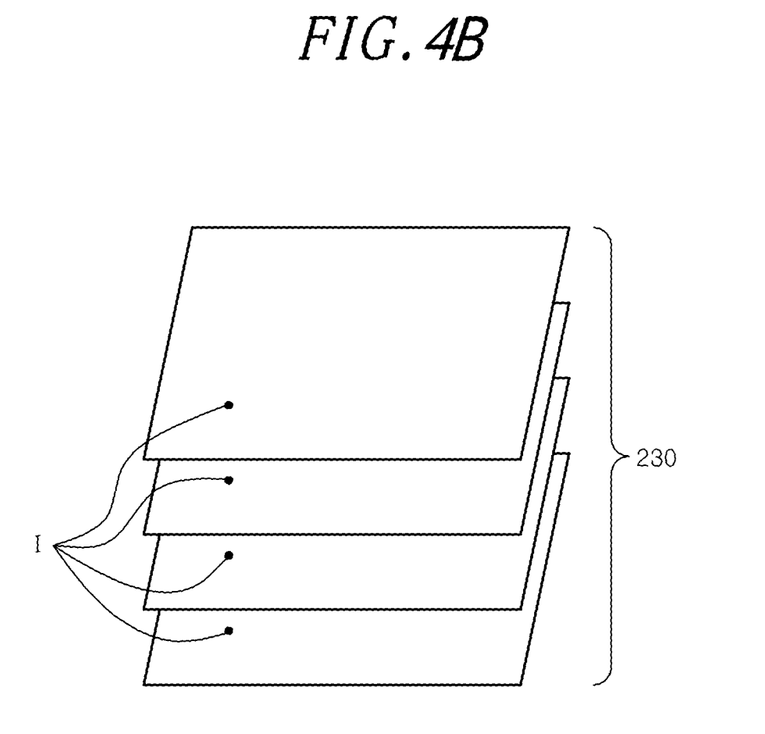
FIG. 4B depicts a diagram illustrating a procedure of correcting the images corresponding to a third section among the images buffered in the fingerprint image processing apparatus.

For example, as illustrated in FIG. 4A, in a case where the first section 210 is composed of five (5) images, a mean value M and a variance V by pixel are calculated such a manner that a mean value M of pixels 410 at given positions in first, second, third, fourth, and fifth images 401, 402, 403, 404, and 405 is calculated; a mean value M and a variance V by block are calculated in such a manner that each of the first, second, third, fourth, and fifth images 401, 402, 403, 404, and 405 are divided into a plurality of blocks and then the mean value M of the blocks in the respective images is calculated; or a mean value M and a variance V by image in such a manner that the mean value M of the first, second, third, fourth, and fifth images 401, 402, 403, 404, and 405 is calculated.

Thereafter, the fingerprint image acquiring unit 126 draws out the images corresponding to the third section 230, i.e., the images buffered for a predetermined time period after the point of time when the fingerprint contact has been completed from the memory unit 128, in operation 310. Subsequently, the fingerprint image acquiring unit 126 offsets the pixels or the blocks in the respective images in the third section 230, or the images in the third section 230 using the mean value, which is stored by pixel, by block, or by image in the memory unit 128, in operation S312.

To put it another way, the variance V and the mean value M are calculated and then stored in the memory unit 128. Here, the variance V may be a variance in pixels at the given locations in the respective images within the first section 210, a variance of the blocks in the respective images within the first section 210, or a variance in the respective images within the first section 210. Subsequently, as illustrated in FIG. 4B, the fingerprint image acquiring unit 126 calculates the value of the pixels at given locations 'I' corresponding to the pixels 410 at the same locations as shown in FIG. 4A, offsets the calculated the pixel value by the mean value M stored in the memory unit 128, and distinguishes between a fingerprint region and a background region by comparing a resultant value caused by the offset with a noise tolerance range (a threshold value) calculated on a basis of the variance V.

The procedure of distinguishing between the fingerprint region and the background region will be described in detail herein below.

First, the fingerprint image acquiring unit 126 calculates an absolute value of the difference between the mean value M on a pixel basis stored in the memory unit 128 and the value of the pixels at the locations I to perform the offset. Thereafter, it is determined whether the calculated absolute value exceeds the noise tolerance range calculated on a basis of the variance V, in operation 314. Here, the noise tolerance range may be derived from the variance V and a constant determining a noise tolerance reference. The constant determining the noise tolerance reference may be set to one value with respect to each image, each block, or each pixel, which may be different from each of the image, block and pixel. That is, the constant may be set beforehand using a statistical analysis of different fingerprint images or advance information on the fingerprint region, e.g., advance information that the brightness of the fingerprint region is always darker than that of the background region.

As a result of the operation 314, when it is determined that the calculated absolute value exceeds the noise tolerance range, the fingerprint image acquiring unit 126 determines that the location I is a part of the fingerprint region, in operation 316.

As a result of the operation 314, however, when it is determined that the calculated absolute value is not exceed the noise tolerance range, the fingerprint image acquiring unit 126 determines that the location I is a part of the background region, in operation 318, and renders the determined location I to have a fixed pixel value C, i.e., a predetermined brightness value, in operation 320.

A series of the operations 310 to 318 as described above is repeatedly performed on a pixel basis, or on a block basis, or on an image basis included in the third section 230, so that the fingerprint region and the background region are distinguished and the background region is set to have the predetermined fixed value C. In accordance with the embodiment, the fixed value C, which is a constant value of the background region, may be set to have different values by pixel or by block so that the background region can be identified from an outer region of the image or a portion other than the fingerprint region.

The fingerprint image acquiring unit 126 distinguishes between the fingerprint region and the background region set to the fixed value in the respective images within the third section 230, gives a predetermined weight to the pixels or blocks that are determined as the fingerprint region, and adds all the weighted values to obtain the fingerprint image.

Although it has been omitted in the embodiments of the present invention, before acquiring the fingerprint image using the images within the third section 230, a preprocessing may be performed on the images within the third section 230. The preprocessing may be implemented by, for example, a morphological filtering, but is not limited thereto.

While the description of the present invention has been made to the exemplary embodiments, various changes and modifications may be made without departing from the scope of the invention. Therefore, the scope of the present invention should be defined by the appended claims rather than by the foregoing embodiments.

What is claimed is:

1. An apparatus for processing a fingerprint image, the apparatus comprising:
   a noise information estimation unit configured to estimate information for a noise removal from at least two or more first section images recognized for a first section before a point of time when a fingerprint contact is initiated; and
   a fingerprint image acquiring unit configured to correct at least one third section image using the estimated information to acquire the fingerprint image;
   wherein the at least one third section image is recognized for a predetermined time period after the completion of the fingerprint contact.

2. The apparatus of claim 1, wherein the point of time when the fingerprint contact is initiated is a point of time when a feature value indicative of whether there exists a fingerprint is subjected to a change in the fingerprint image processing apparatus.

3. The apparatus of claim 2, wherein the feature value is a value output from a proximity sensor installed in the fingerprint image processing apparatus, a value output from a transparent electrode sensor to which the fingerprint is contacted, or a changed value in a pixel in the image recognized in the fingerprint image processing apparatus.

4. The apparatus of claim 1, wherein the noise information estimation unit is configured to estimate the information by calculating a mean value and a variance by pixel or by block having a given size or by image in the respective first section image within the first section.

5. The apparatus of claim 4, wherein the fingerprint image acquiring unit is configured to:
   calculate a noise tolerance range based on the variance,
   calculate pixel values by pixel or by block, or by image in the respective third section image from after the completion of the fingerprint contact to a predetermined time period, offset the calculated pixel values using a mean value calculated by the noise information estimation unit, and determine a background region and a fingerprint region through the comparison between a resultant value caused by the offset and the noise tolerance range; and set the background region to a predetermined fixed value to acquire the fingerprint image.

6. The apparatus of claim 5, wherein the fingerprint image acquiring unit is configured to give a weight to portions which has been set as the fingerprint region for the predetermined time period after the completion of the fingerprint contact and add the weighted values to acquire the fingerprint image.

7. The apparatus of claim 5, wherein the noise tolerance range is calculated using the variance and a noise tolerance standard that is set by pixel, by block or by image.

8. The apparatus of claim 1, further comprising:
a buffer configured to buffer images that are input to the fingerprint image processing apparatus from before a point of time when the fingerprint contact is recognized to the predetermined time period.

9. A method for processing a fingerprint image, the method comprising:
buffering images for the storage thereof;
storing a point of time when a fingerprint contact is initiated in the course of buffering the images;
drawing out first section images within a first section among the buffered images, wherein the first section is a section before a point of time when the fingerprint contact is initiated;
estimating information for a noise removal when a predetermined time period lapse after the fingerprint contact has been completed; and
drawing out third section images within a third section among the buffered images, wherein the third section is a section from after the completion of the fingerprint contact to the predetermined time period; and
correcting the third section images within the third section using the estimated information to acquire the fingerprint image.

10. The method of claim 9, wherein said storing a point of time when a fingerprint contact is initiated:

storing a point of time when a feature value indicative of whether there exists a fingerprint is subjected to a change in the fingerprint image processing apparatus.

11. The method of claim 10, wherein the feature value is a value output from a proximity sensor installed in the fingerprint image processing apparatus, a value output from a transparent electrode sensor to which the fingerprint is contacted, or a changed value in a pixel in the image recognized in the fingerprint image processing apparatus.

12. The method of claim 9, wherein said estimating information for a noise removal comprises:
estimating the information by calculating a mean value and a variance by pixel or by block having a given size, or by image using at least two first section images within the first section.

13. The method of claim 12, wherein said correcting the third section images comprises:
calculating a noise tolerance range based on the variance,
calculating pixel values by pixel, or by block or by image of the respective third section images within the third section;
offsetting the calculated pixel values using a mean value calculated by the noise information estimation unit and determining a background region and a fingerprint region through the comparison between a resultant value caused by the offset and the noise tolerance range; and
setting the background region to a predetermined fixed value to acquire the fingerprint image.

14. The method of claim 13, wherein said correcting the third section images comprises:
giving a weight to portions which has been set as the fingerprint region the third section images within the third section; and
adding the weighted values to acquire the fingerprint image.

15. The method of claim 13, wherein said calculating a noise tolerance range comprises:
calculating the noise tolerance range using the variance and a noise tolerance standard that is set by pixel, by block or by image.

* * * * *